United States Patent
Chen et al.

(10) Patent No.: US 10,572,196 B2
(45) Date of Patent: Feb. 25, 2020

(54) DATA CONNECTION PRINTING

(71) Applicant: Hewlett-Packard Development Company, L.P., Houston, TX (US)

(72) Inventors: Hang Chen, Shanghai (CN); Yong-Shun Ma, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,589

(22) PCT Filed: Aug. 1, 2016

(86) PCT No.: PCT/CN2016/092678
§ 371 (c)(1),
(2) Date: Oct. 29, 2018

(87) PCT Pub. No.: WO2018/023332
PCT Pub. Date: Feb. 8, 2018

(65) Prior Publication Data
US 2019/0163417 A1    May 30, 2019

(51) Int. Cl.
*G06F 3/12* (2006.01)
*G06K 15/00* (2006.01)
*G06K 15/12* (2006.01)

(52) U.S. Cl.
CPC .......... *G06F 3/1213* (2013.01); *G06F 3/1236* (2013.01); *G06F 3/1279* (2013.01); *G06K 15/12* (2013.01); *G06K 15/406* (2013.01); *G06K 15/4045* (2013.01)

(58) Field of Classification Search
CPC .... G06F 3/1213; G06F 3/1279; G06F 3/1236; G06K 15/12; G06K 15/4045; G06K 15/4055; G06K 15/406; H04N 1/00885
See application file for complete search history.

(56) References Cited

U.S. PATENT DOCUMENTS

| | | | |
|---|---|---|---|
| 8,675,215 B2 | 3/2014 | Sweet et al. | |
| 2011/0211771 A1 | 9/2011 | Rubenstein et al. | |
| 2011/0242575 A1* | 10/2011 | Owen | G03G 15/50 358/1.15 |
| 2013/0159925 A1 | 6/2013 | Leffert et al. | |
| 2013/0174082 A1 | 7/2013 | Khandker et al. | |
| 2014/0168277 A1 | 6/2014 | Ashley et al. | |
| 2014/0289614 A1 | 9/2014 | Ayers | |
| 2018/0035480 A1* | 2/2018 | Mihira | H04W 76/14 |

* cited by examiner

*Primary Examiner* — Kent Yip
(74) *Attorney, Agent, or Firm* — Brooks, Cameron & Huebsch PLLC

(57) ABSTRACT

Example implementations relate to data connection printing. For example, a printing device may include a wireless data connection and a wired data connection. The printing device may include an engine controller including a processing resource and a memory resource coupled to the processing resource, where the memory resource stores instructions executable by the processing resource to determine whether a print job is received via the wireless data connection or the wired data connection and based on the determination, print the print job in a print mode corresponding to either the wireless data connection or the wired data connection.

19 Claims, 3 Drawing Sheets

DATA CONNECTION PRINTING

BACKGROUND

A printing device may include a device that accepts a print job output from a computing device and transfers the print job to a print medium, such as a sheet of paper. The print job may include a stream of electronic data received at the printing device. The electronic data may be received at a data connection communication port of the printing device.

DETAILED DESCRIPTION

Figure 1:
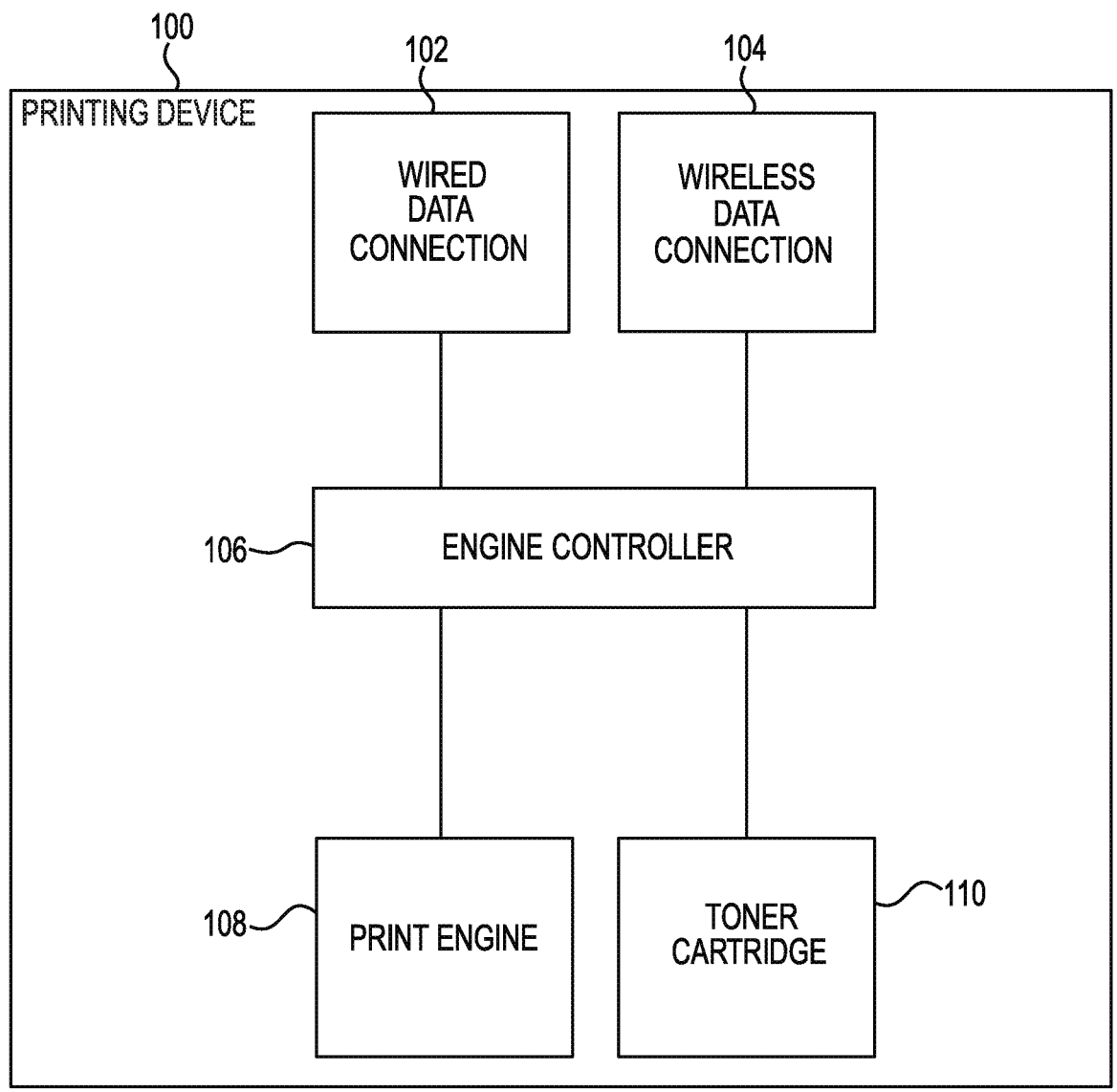
FIG. 1 illustrates an example of a printing device for data connection printing according to the present disclosure.

Printing devices may utilize various printing components to print a print job. Printing a print job may include creating a print of a print job onto a print medium. The various printing components may operate to create the print on the sheet of print medium. A printing device may initiate the functioning of various printing components utilized in printing the print job.

A printing device may include a laser printer. As used herein, a laser printer may include a printing device that creates prints on print medium utilizing a laser beam projecting an image of a page to be printed onto a photoconductive drum by causing charged electrons to fall away from the areas of the drum exposed to the laser light. A laser printer may introduce toner particles that are electrostatically attracted to the charged areas of the drum that have not been laser-beamed. The laser printer may utilize the drum to transfer the image onto the print medium by direct contact between the print medium and the toner. The laser printer may pass the printed upon print medium onto a finisher, which may utilize heat to instantly fuse the toner onto the print medium.

The components of a laser printer may include a print engine. A print engine may include a photoconductive drum assembly, a fuser, a developer roller, a toner adder roller, a charge roller, a transfer roller, a waste bin with a wiper blade, a mirror, a laser scanning unit, a corona wire, a discharge lamp, a lens, and/or associated heating elements, among other possible elements. To produce a print job the print engine and/or portions of the print engine may be warmed up. For example, the image transfer drum and rollers may be warmed up prior to producing the print job. The imaging drum may be cleaned by negatively charging the drum while a flange clears off all past toner residue. In order for the imaging drum to be ready to accept a positive charge that will ultimately attract and hold toner particles to it before being transferred to a printer medium the imaging drum may be warmed by spinning the drum and rollers. The components may be warmed up by spinning and/or by other heating mechanisms to temperatures at least as high as two hundred degrees Celsius (three hundred and ninety-two degrees Fahrenheit).

The laser printer may include a toner cartridge. A toner cartridge may include a reservoir housing toner particles and various components to apply the toner particles to the surface of a photoreceptor drum. The toner cartridge may be warmed up. Warming up a toner cartridge may include heating toner cartridge components. Warming up a toner cartridge may include charging the toner particles to give them a negative charge inside the cartridge.

Warming up the print engine and/or the toner cartridge may occur over a period of time. That is, before beginning the transfer of the toner material onto the print medium the print engine and/or the toner cartridge may undergo a warm up over a period of time. Therefore, a delay corresponding to this period of time may occur between receiving a print job or initiating a printing of the print job and actually transferring toner to print medium while the print engine and/or toner cartridge are warmed up.

However, it may not be suitable for the components of a laser printer such as the print engine and toner cartridge to remain warmed up for an extended period of time and/or remain warmed up without carrying out the toner transfer to the print medium. For example, the print engine components and/or the toner cartridge may become damaged and/or worn out by prolonged exposure to high temperatures, heating, mechanical stresses of spinning, and prolonged application of electrical charges.

In order to preserve the functionality and lifespan of the print engine and/or the toner cartridge a cool down and/or spin down of the components may occur over a period of time. A cool down may include causing or allowing the print engine components and/or the toner cartridge temperature to reduce by removing heating sources and/or exposing the print engine components and/or toner cartridge to a cooling action. A cool down may also include causing or allowing dissipation of an electrical charge applied to the print engine and/or the toner cartridge. A spin down may include causing or allowing spinning mechanical components of the print engine and/or toner cartridge to slow down or cease their spinning action.

A cool down or a spin down may be performed after the print engine and/or the toner cartridge reach a certain temperature, after a predetermined amount of time, after a predetermined amount of time relative to beginning or ending a transfer of toner to medium, a predetermined amount of time relative to beginning a printing of a print job, and/or a predetermined amount of time relative to finishing printing a page of a print job and starting printing a next page of the print job. A cool down or a spin down may occur over a period of time that may translate to a delay in printing a page of a print job. For example, if the print engine and/or the toner cartridge are subject to a cool down or a spin down they will not be available to transfer toner to the print medium or perform the other steps involved in the printing of the print job on print medium. Therefore, printing of the print job may be delayed until completion of a cool down or a spin down. Thereafter, printing the print job may be furthered delayed while the print engine and/or the toner cartridge is warmed back up.

A print job may be delivered as data to a printing device such as a laser printer. The print job data may be supplied by a computing device. The data may be delivered to the printing device via a data communication connection. A printing device may have different types of data communication connections that may send and receive data at different rates. For example, a wired data connection may send or receive print job data at a rate of greater than one megabyte per second, which is a high throughput rate relative to a wireless data connection. A wireless data connection may send or receive print job data at a rate less than one megabyte per second.

In order to print a print job, a printing device may rely on a supply of print job data as discussed above. The arrival and/or the rate of arrival of the print job data may, therefore, influence the speed with which a printing device may generate prints. That is, a printing device may not print a print job data that it has not yet received. In some examples, the data communication connections may not be able to receive and/or provide the data to a controller quickly enough to sustain printing of a print job substantially continuously through to completion. As such, additional warmup, cool downs, and/or spin downs may be utilized resulting in delay to completion of a printing job.

A data communication connection may not be able to receive and/or provide the data to a controller quickly enough to initiate, after a warmup, the portion of the printing process including feeding print medium through the print engine and transferring toner to the print medium before a cool down or spin down is initiated, thereby delaying the printing of the print job.

A data communication may be able to receive the data and/or provide the data to a controller at a high enough rate that the data to initiate the portion of the printing process including feeding print medium through the print engine and transferring toner to the print medium arrives before a warmup of the print engine and/or toner cartridge is complete. In such examples, the printing of the page may be delayed while the warmup is completed.

In contrast, data connection printing in accordance with the present disclosure allows for printing a print job in a print mode selected in a data connection dependent manner. As a result, a printing operation may be fine-tuned to the data connection type, the throughput associated with the data connection type, and/or the warmup and cooldown functions of a printing device. The examples of the present disclosure may eliminate delays in the printing process by more efficiently orchestrating the receiving of print job data, the warming up of a print engine and toner cartridge, the cooling down of the print engine and toner cartridge, and the printing of the print job to a print medium.

FIG. 1 illustrates an example of a printing device 100 for data connection printing according to the present disclosure. The printing device 100 may be a laser printer. The printing device 100 may include a variety of data communication connections. The data communication connections may include an interface for communicating data such as print job data. A data communication connection may facilitate transmission of the data from and/or to a computing device and from and/or to an engine controller 106 of the printing device 100.

A data communication connection may include a wired data connection 102. As used herein, a wired data connection 102 may include a connection that communicates with a computing device via a cabled connection. In some examples, a wired data connection 102 may include a USB connection, a serial connection (e.g., RS-232, EIA-422, etc.), a parallel connection, a FireWire connection, a USB AB connection, etc. A wired data connection 102 may include a connection facilitated by a USB port included in the printing device 100.

A data communication connection may include a wireless data connection 104. As used herein, a wireless data connection 104 may include a Wi-Fi data connection, a Bluetooth connection, or other type of data connection that allows the printing device 100 to communicate with a computing device and/or local area network without the use of a physical connection or cabling. A Wi-Fi data connection may include a connection facilitated by a wireless antennae included in the printing device 100.

The wireless data connection 104 may have a throughput rate at which it can receive and/or transmit data such as print job data. The wired data connection 102 may also have a throughput rate at which it can receive and/or transmit data such as print job data. The wireless data connection 104 throughput rate may be lower than the wired data connection 102 throughput rate. For example, the wired data connection 102 may have a greater than one megabyte per second throughput rate while the wireless data connection 104 may have a less than or equal to one megabyte per second throughput rate. Additionally, the wired data connection 102 may have a more stable data delivery rate and/or frequency than the wireless data connection 104. For example, the wireless data connection 104 may have a data throughput rate that fluctuates more than the wired data connection 102.

The printing device 100 may include an engine controller 106. The engine controller 106 may include a printed circuit board. The engine controller 106 may include a processing resource which may include a dedicated CPU. The engine controller 106 may include a memory resource coupled to a processing resource. The memory resource may include stored instructions that are executable by the processing resource to perform specific functions. These functions may generally include translating print job data and/or other commands output from a computing device and/or software into signals that a print engine 108 may use to print a page.

The print engine 108 may include the central mechanism of the printing device 100. In some examples, the print engine 108 may include the engine controller 106. The print engine 108 may include the mechanics that are used to execute the signals from the print controller 106 in order to render the print job onto print medium. The print engine 108 may include a photoconductive drum assembly, a fuser, a developer roller, a toner adder roller, a charge roller, a transfer roller, a waste bin with a wiper blade, a mirror, a laser scanning unit, a corona wire, a discharge lamp, a lens, and/or associated heating elements.

The printing device 100 may include a toner cartridge 110. In some examples, the toner cartridge 110 may be a component of the print engine 108. The toner cartridge 108 may include a reservoir housing toner particles and various components to apply the toner particles to the surface of a photoreceptor drum.

The print engine 108 and/or the toner cartridge 110 may be in various states. For example, the print engine 108 and toner cartridge 110 may be in an idle state. An idle state may include a state where the print engine 108 and the toner cartridge 110 are not prepared to begin printing a print job. Not being prepared to print a print job may include the components of the print engine 108 and/or the toner cartridges 110 being outside operating parameters associated with printing the print job such as temperature, charge, and/or rate of spin. In an example, the print engine 108 and/or toner cartridge 110 may be in a transitional state. A transitional state may include a state where the print engine 108 and/or the toner cartridge 110 are outside of operating parameters associated with printing the print job or an idle state, but the print engine 108 and the toner cartridge 110 are undergoing preparatory processes (e.g., warming up, cooling down, spinning down, etc.) to achieve the operating parameters and transition to another state. In an example, the print engine 108 and/or toner cartridge 110 may be in an active state. An active state may include a state where the print engine 108 and/or the toner cartridge 110 are within operating parameters associated with printing the print job.

The active state may include a state where the print engine 108 and/or the toner cartridge 110 are actively printing a print job.

As described above, the engine controller 106 may include a processing resource and a memory resource coupled to the processing resource. The memory resource may store instructions executable by the processing resource to determine whether a print job is to be received via the wireless data connection 104 or the wired data connection 102. Determining whether a print job is to be received via the wireless data connection 104 or the wired data connection 102 may be performed utilizing a variety of techniques to identify an intended route for data such as print job data. For example, determining whether a print job is to be received via the wireless data connection 104 or the wired data connection 102 may be performed by analysis of a handshake communication protocol between a computing device transmitting the print job and the printing device 100. As used herein a handshake may include an automated process of negotiation that sets parameters of a communication channel (e.g., a wireless data connection 104 or a wired data connection 102) established between two entities (e.g., a computing device transmitting a print job and a printing device 100) before normal communication over the channel begins. The handshake may follow the physical establishment of the channel and may precede normal information transfer. The handshake may establish parameters such as a data transfer rate, coding alphabet, parity, interrupt procedure and/or other protocol or hardware procedures.

The analysis of the handshake protocol may include identifying that the handshake has taken place or is presently occurring. Furthermore, the analysis of the handshake protocol may include recognizing or identifying the data communication connection based on the data communication specified in the handshake. For example, the analysis of the handshake protocol may include identifying a wired data connection 102 or a wireless data connection 104 over which a print job is to be received based on a communication protocol specified in the handshake between the printing device 100 and a computing device from which the print job is transmitted.

The memory resource of the engine controller 106 may store instructions executable by the processing resource to, based on the determination described above, print the print job in a print mode corresponding to either the wireless data connection 104 or the wired data connection 102. As used herein, a print mode may include an operation and/or a series of operations performed on and/or by the printing device 100 components, such as the print engine 108 and the toner cartridge 110, to bring the printing device 100 to a target state, such as an inactive state, an active state, and/or a transitional state.

A print mode may include a first mode associated with a particular data connection type. For example, a print mode may include a first mode or set of operations associated with a wireless data connection 104. Since a wireless data connection 104 may have a lower data throughput rate than a wired data connection 102, the first mode may be optimized to utilize a lower data throughput rate.

The first print mode may include a set of operations including warming up the print engine 108. The first print mode may include a set of operations including warming up the tone cartridge 110. The first mode may include a set of operations to warm up the print engine 108 and/or toner cartridge 110 according to a set schedule relative to the receipt of print data. For example, the first mode may include a set of operations to warm up the print engine 108 and/or toner cartridge 110 after at least one whole page (e.g., print job data that corresponds to all the data to be rendered upon one physical page of print medium) of the print job is received via the wireless data connection. In this manner, the printing of the print job may be delayed for a period of time corresponding to completing the transmission/reception of at least one whole page of print data via the wireless data connection 104. However, utilization of this first mode may actually decrease the first page out time. For example, since a wireless data connection 104 may have a lower data throughput rate and more instability relative to the wired data connection 102 delaying the initiation of a printing process until a whole page of print job data is received may prevent the printing device 100 from prematurely running out of print job data to continuously process and/or print causing an interruption to the printing process. Interrupting printing the print job may cause the printing device 100, the print engine 108, and/or toner cartridge 110 to move from an active state to a transitional state, from the transitional state to an inactive state, and from the inactive state to the transitional state and back to the active state. Therefore, interrupting the print job may cause various warming up, cooling down, and/or spinning down of the print engine 108 and/or toner cartridge 110 which may delay the first page out time since the printing device 100 may not be able to resume printing, even if it has received and/or processed additional print job data in the interim, until the various warming up, cooling down, and/or spinning down operations are completed. A first mode may prevent such undesirable interruptions by waiting to print a page of the print job until it is received which eliminates the possibility that an interruption may occur before printing or completion of printing the first page of print data and may provide data reception a "head start" relative to printing to ensure an uninterrupted supply of data for processing and printing.

A print mode may include a second mode associated with a particular data connection type. For example, a print mode may include a second print mode or set of operations associated with a wired data connection 102. Since a wired data connection 102 may have a higher data throughput rate than a wireless data connection 104, the second mode may be optimized to utilize a higher data throughput rate.

The second print mode may include a set of operations including warming up the print engine 108. The second print mode may include a set of operations including warming up the tone cartridge 110. The second mode may include a set of operations to warm up the print engine 108 and/or toner cartridge 110 according to a set schedule relative to the receipt of print data. For example, the second mode may include a set of operations to warm up the print engine 108 and/or toner cartridge 110 before a first byte of the print job is received via the wired data connection 102.

The second mode may be initiated prior to receiving the first byte of the print job responsive to a pre-notification to the engine controller 106, the print engine 108, and/or the toner cartridge 110. The pre-notification may include a signal to the engine controller 106, the print engine 108, and/or the toner cartridge 110 generated responsive to a determination that the wired data connection 102 will be the data connection type over which the print job is to be received. For example, the pre-notification may be generated based on the analysis of the handshake protocol. In an example, the pre-notification may be generated and/or transmitted to the engine controller 106, the print engine 108, and/or the toner cartridge 110 responsive to identifying a wired data connection 102 over which a print job is to be received based on a communication protocol specified in the handshake between the printing device 100 and a computing device from which the print job is transmitted. In some examples, the engine controller 106 may generate and/or transmit the pre-notification signal. In some examples, the engine controller 106 may initiate the operations associated with printing the print job responsive to receiving or generating the pre-notification signal. The pre-notification signal may be a signal generated and/or received prior to receiving any of print job data.

The second print mode may cause an earlier initiation of operations to warm up the print engine 108 and/or toner cartridge 110 relative to the second print mode. The second print mode may cause an earlier initiation of operations to warm up the print engine 108 and/or toner cartridge 110 relative to standard print modes that may wait to initiate operations until after the first byte of the print job data is receive. As a result, the first page out time of a pint job printed with the second mode may be decreased relative to the standard mode and/or the first mode. As discussed above, printing interruptions causing the printing device 100, the print engine 108, and/or toner cartridge 110 to move from an active state to a transitional state, from the transitional state to an inactive state, and from the inactive state to the transitional state and back to the active state remain a concern. However, since the wired data connection 102 may have a higher data throughput rate and more stability relative to the wireless data connection 104, beginning operations such as a warming up of the print engine 108 and/or toner cartridge 110 before receiving the first byte of the print job may not lead to printing interruptions as the data throughput rate of the wired data connection 102 is high enough and stable enough to provide enough print job data to continuously process and/or print without interruption to the printing process. A second print mode may provide the warmup of the print engine 108 and the toner cartridge 110 components a "head start" relative to printing since an uninterrupted supply of data for processing and printing is not a concern at the elevated data throughput rate of the wired data connection 102.

Figure 2:
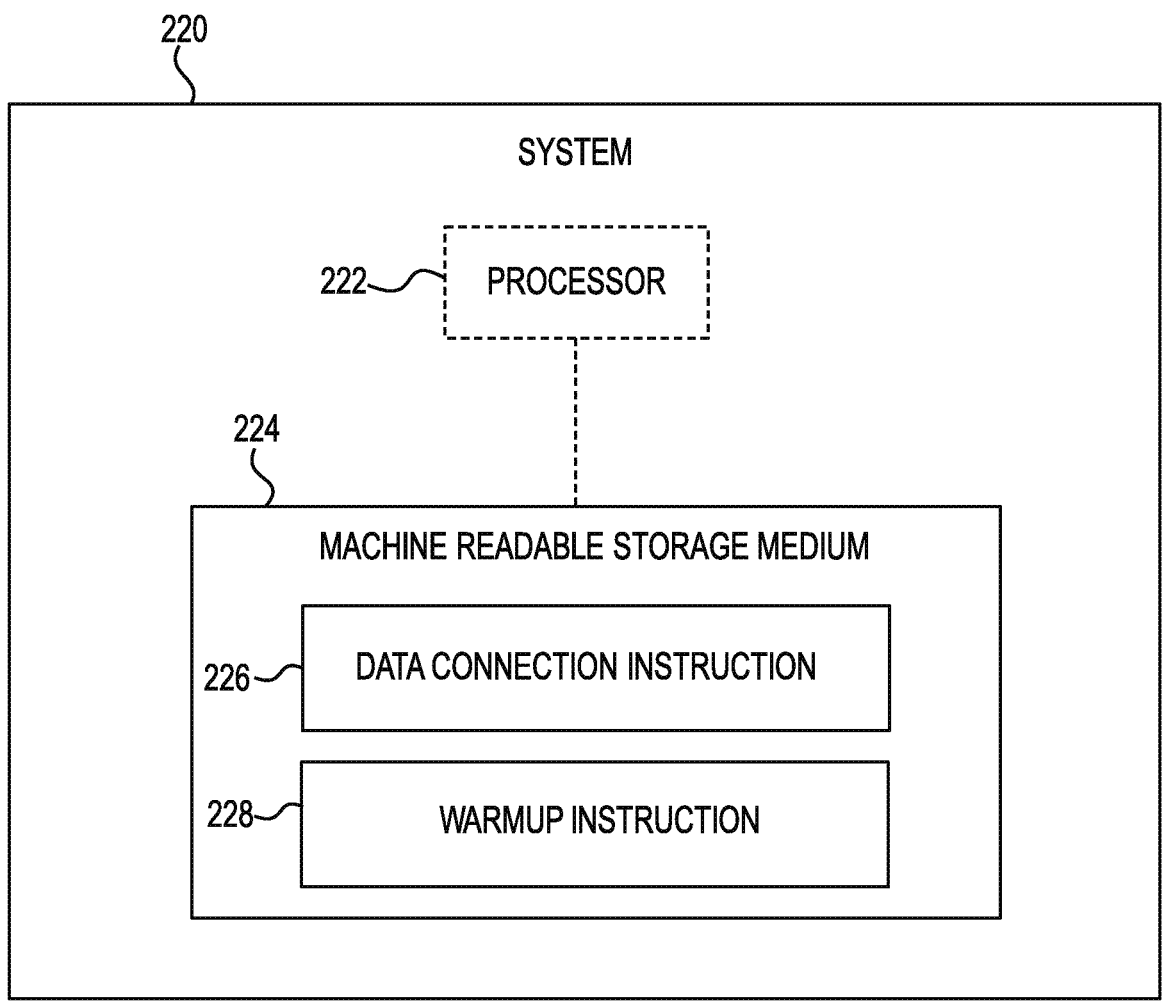
FIG. 2 illustrates an example of a system for data connection printing according to the present disclosure.

FIG. 2 illustrates an example of a system 220 for data connection printing. The system 220 may include at least one computing device that is capable of communicating with at least one remote system. In the example of FIG. 2, system 220 includes a processor 222 and a machine-readable storage medium 224. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors. Processor 222 may include a processing resource located in or utilized by the printing device 100 illustrated in FIG. 1.

Processor 222 may be one or more central processing units (CPUs), microprocessors, and/or other hardware devices suitable for retrieval and execution of instructions stored in machine-readable storage medium 224. In the particular example shown in FIG. 2, Processor 222 may receive, determine, and send instructions 226, 228 for data connection printing. As an alternative or in addition to retrieving and executing instructions, processor 222 may include one or more electronic circuits comprising a number of electronic components for performing the functionality of one or more of the instructions in machine-readable storage medium 224. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 224 may be any electronic, magnetic, optical, or other physical storage device that stores executable instructions. Thus, machine-readable storage medium 224 may be, for example, Random Access Memory (RAM), an Electrically-Erasable Programmable Read-Only Memory (EEPROM), a storage drive, an optical disc, and the like. Machine-readable storage medium 224 may be disposed within system 220, as shown in FIG. 2. In this situation, the executable instructions may be "installed" on the system 220. Additionally and/or alternatively, machine-readable storage medium 224 may be a portable, external or remote storage medium, for example, that allows system 220 to download the instructions from the portable/external/remote storage medium. In this situation, the executable instructions may be part of an "installation package". As described herein, machine-readable storage medium 224 may be encoded with executable instructions for data connection printing.

Referring to FIG. 2, data connection instructions 226, when executed by a processor, such as processor 222, may cause system 200 to determine whether a printing device Is to receive a print job via a wireless data connection or a wired data connection of the printing device. The determination of whether a printing device Is to receive a print job via a wireless data connection or a wired data connection of the printing device may be based on the type of communication protocol handshake between a client side device, such as a computing device, server, network of other device sending a print job, and firmware of the printing device. For example, a communication protocol handshake may establish that the print job data will be transmitted to the printing device via a wireless data connection or a wired data connection. A wireless data connection may have a data throughput rate that is less than a data throughput rate of the wired data connection.

In an example, the communication protocol handshake may indicate that print job data is to be received by the printing device, printer engine controller, and/or toner cartridge via a wired data connection. In such an example, the data connection instructions 226, when executed by a processor, such as processor 222, may cause system 200 to generate a pre-notification signal and/or transmit the pre-notification to the print engine when the printing device is to receive the print job via the wired data connection. The pre-notification signal may be generated and/or transmitted prior to receiving a first byte of print job data at the printing device and/or engine controller of the printing device.

Warmup instructions 228, when executed by a processor, such as processor 222, may cause system 200 to initiate a warmup of a print engine and/or a toner cartridge before a first byte of the print job is received by the printing device when the printing device is determined to receive the print job via the wired data connection. Initiating such a warmup may be performed in response to the determination. For example, the warmup may be initiated in response to receipt of a pre-notification signal. In some examples, warmup instructions 228, when executed by a processor, such as processor 222, may cause system 200 to initiate a warmup of a print engine and/or a toner cartridge after a whole page of the print job is received by the printing device when the printing device is determined to receive the print job via the wireless data connection.

Figure 3:
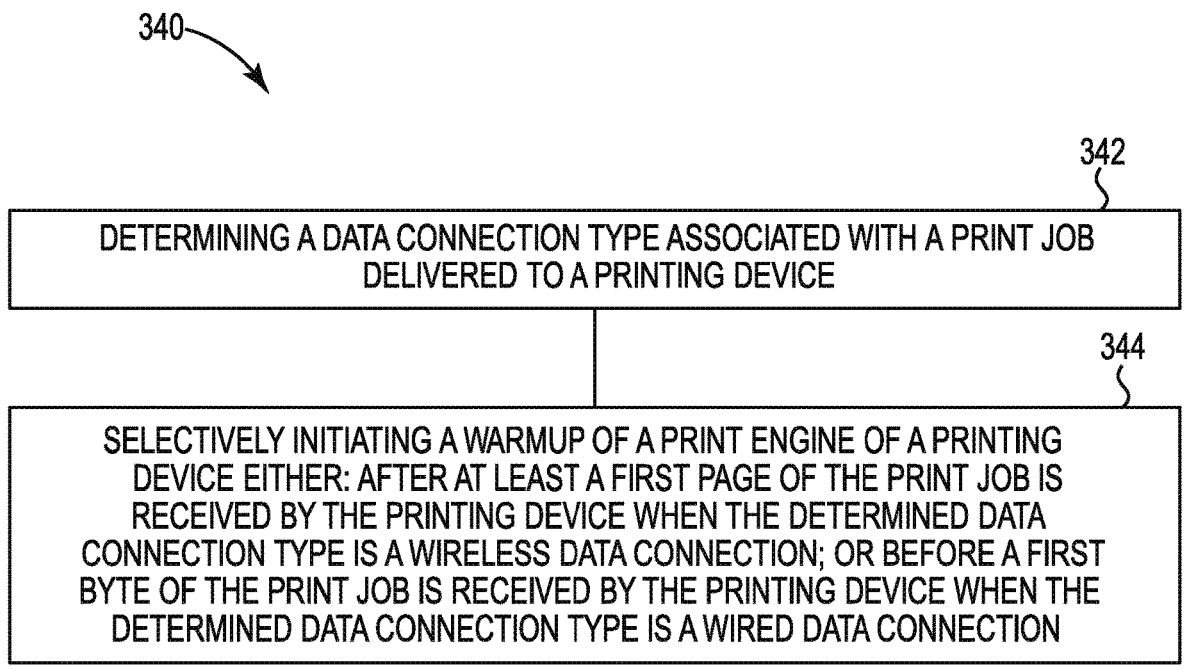
FIG. 3 illustrates an example of a method for data connection printing according to the present disclosure.

FIG. 3 illustrates an example of a method 340 for data connection printing according to the present disclosure. At 342, method 340 may include determining a data connection type associated with a print job delivered to a printing device. Determining the data connection type may occur prior to the receipt of any data of the print job at the printing device. For example, the data connection type may be determined based on handshake communication protocol prior to the transmission of any print job data. Determining a data connection type may include determining whether a data connection associated with a print job is a wireless data connection or a wired data connection.

At 344, method 340 may include selectively initiating a warmup of a print engine of a printing device. Selectively initiating a warmup may include selecting one of a plurality of print modes to utilize for printing the print job. The print modes may distinctly time the initiation of printing operations, such as a print engine warmup. For example, selectively initiating the warmup may include initiating the warmup of the print engine after at least a first page of the print job is received by the printing device when the determined data connection type is a wireless data connection. In another example, selectively initiating the warmup may include initiating the warmup of the print engine before a first byte of the print job data is received by the printing device when the determined data connection type is a wired data connection.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", "P", "Q", "R", "S", and "T" particularly with respect to reference numerals in the drawings, indicate that a number of the particular feature so designated can be included with examples of the present disclosure. The designators can represent the same or different numbers of the particular features. Further, as used herein, "a" and/or "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:
1. A printing device comprising:
   a wireless data circuit;
   a wired data circuit;
   an engine circuit comprising a processing circuit and a memory circuit coupled to the processing circuit, wherein the memory circuit stores instructions executable by the processing circuit to:
      determine whether a print job is received via the wireless data circuit or the wired data circuit; and
      based on the determination, print the print job in a first print mode corresponding to the wireless data circuit or a second print mode corresponding to the wired data circuit, wherein the first print mode and the second print mode include a distinct set of operations to warm up components of the printing device according to a set schedule relative to receipt of the print job.

2. The printing device of claim 1, wherein the first print mode includes warming up a the print engine after a whole page of the print job is received via the wireless data circuit.

3. The printing device of claim 1, wherein the first print mode includes warming up a the print engine after a whole page of the print job is received via the wireless data circuit.

4. The printing device of claim 3, wherein the first print mode further includes warming up a print cartridge after the whole page of the print job is received via the wireless data circuit.

5. The printing device of claim 1, wherein the printing device is a laser printing device.

6. The printing device of claim 1, wherein the wireless data circuit is a Wi-Fi data circuit facilitated by a wireless antennae included in the printing device.

7. The printing device of claim 1, wherein the wired data circuit is a USB data circuit facilitated by a USB port included in the printing device.

8. The printing device of claim 1, wherein the distinct set of operations to warm up components of the printing device include operations to warm up a print engine.

9. The printing device of claim 1, wherein the distinct set of operations to warm up components of the printing device include operations to warm up a print cartridge.

10. The printing device of claim 1, wherein the distinct set of operations to warm up components of the printing device include operations to warm up a print engine and a print cartridge.

11. A non-transitory computer-readable medium containing instructions executable by a processor to cause the processor to:
   determine whether a printing device is to receive a print job via a wireless data circuit or a wired data circuit of the printing device;
   based on the determination, print the print job in a first print mode corresponding to the wireless data circuit or a second print mode corresponding to the wired data circuit, wherein the first print mode and the second print mode include a distinct set of operations to warm up components of the printing device according to a set schedule relative to receipt of the print job; and
   initiate a warm up of a print engine-before a first byte of the print job is received by the printing device when it is determined the printing device is to receive the print job via the wired data circuit.

12. The medium of claim 11, further including instructions to determine whether the printing device is to receive the print job via the wireless data circuit or the wired data circuit based on a type of communication protocol handshake between a client side driver and firmware of the printing device.

13. The medium of claim 12, further including instructions to transmit a pre-notification to the print engine when the printing device is to receive the print job via the wired data circuit.

14. The medium of claim 11, further including instructions to initiate a warmup of a toner cartridge of the printing device before the first byte of the print job is received when the printing device is to receive the print job via the wired data circuit.

15. The medium of claim 11, wherein the wireless data circuit has a data throughput rate that is less than a data throughput rate of the wired data circuit.

16. The medium of claim 11, wherein the instructions to warm up components of the printing device include instructions to warm up a print cartridge of the printing device according to the set schedule.

17. A method comprising:
   determining a data connection type associated with a print job delivered to a printing device;
   printing the print job in a first print mode, based on the determination and in response to receipt of the print job by a wireless data circuit of the printing device or a second print mode in response to receipt of the print job by a wired data circuit of the printing device, wherein the first print mode and the second print mode include a distinct set of operations to warm up components of the printing device according to a set schedule relative to receipt of the print job; and
   selectively initiating a warmup of a print engine of the printing device either:
      after at least a first page of the print job is received by the printing device when the determined data connection type is via the wireless data circuit; or
      before a first byte of the print job is received by the printing device when the determined data connection type is via the wired data circuit.

18. The method of claim 17, wherein determining the data connection type associated with the print job occurs prior to receipt of any data of the print job printing at the printing device.

19. The method of claim 17, wherein warming up components of the printing device includes warming up a print cartridge of the printing device according to the set schedule.

* * * * *